United States Patent
Edwards et al.

(10) Patent No.: US 9,026,111 B2
(45) Date of Patent: May 5, 2015

(54) METHOD AND SYSTEM OF HANDLING REQUESTS FOR LOCATION INFORMATION OF MOBILE DEVICES

(75) Inventors: Mike J. Edwards, Plainfield, IL (US); Frances M. Chin, Naperville, IL (US); John M. Gafrick, Naperville, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 634 days.

(21) Appl. No.: 12/662,703

(22) Filed: Apr. 29, 2010

(65) Prior Publication Data

US 2011/0269455 A1 Nov. 3, 2011

(51) Int. Cl.
*H04W 4/00* (2009.01)
*H04W 8/12* (2009.01)
*H04W 4/12* (2009.01)
*H04W 64/00* (2009.01)
*H04W 88/06* (2009.01)

(52) U.S. Cl.
CPC ...... *H04W 8/12* (2013.01); *H04W 4/12* (2013.01); *H04W 64/003* (2013.01); *H04W 88/06* (2013.01)

(58) Field of Classification Search
CPC ...... H04W 48/18; H04W 48/16; H04W 88/06
USPC ................ 455/435.2, 435.1, 436, 432.1, 433, 455/422.1, 552.1
See application file for complete search history.

(56) References Cited

U.S. PATENT DOCUMENTS

| 6,112,090 | A | * | 8/2000 | Valentine | 455/445 |
| 6,377,804 | B1 | * | 4/2002 | Lintulampi | 455/435.2 |
| 6,535,741 | B1 | * | 3/2003 | Aschir et al. | 455/445 |
| 7,386,312 | B2 | * | 6/2008 | Kanto et al. | 455/435.1 |
| 2005/0266843 | A1 | * | 12/2005 | Shimominami et al. | 455/432.3 |
| 2008/0181372 | A1 | * | 7/2008 | Heldenbrand et al. | 379/88.13 |
| 2008/0267128 | A1 | * | 10/2008 | Bennett et al. | 370/331 |
| 2009/0086672 | A1 | * | 4/2009 | Gholmieh et al. | 370/329 |
| 2009/0257649 | A1 | | 10/2009 | Yamauchi et al. | |
| 2009/0258649 | A1 | | 10/2009 | Salowey | |
| 2010/0080171 | A1 | * | 4/2010 | Rune et al. | 370/328 |

FOREIGN PATENT DOCUMENTS

| CN | 101669376 A | | 3/2010 |
| KR | 2004088660 A | * | 10/2004 |
| WO | WO 92/08327 | | 5/1992 |
| WO | WO 2008/088258 | | 7/2008 |
| WO | WO 2008/088889 | | 7/2008 |
| WO | WO 2009/000313 | | 12/2008 |

OTHER PUBLICATIONS

International Search Report and Written Opinion for international patent application No. PCT/US2011/032206 dated Jul. 26, 2011.

(Continued)

*Primary Examiner* — Nghi H Ly
(74) *Attorney, Agent, or Firm* — Harness, Dickey & Pierce

(57) ABSTRACT

Example embodiments provide methods of handling a request for location information for a mobile device attached to a wireless system that supports multiple types of radio access technology. In one embodiment, the mobile device is triggered, by a network element, to send location information without causing the mobile to fall back from a first network of the wireless system to a second network of the wireless system, the first network conforming to a later generation of radio access technology than the second network.

17 Claims, 3 Drawing Sheets

(56) References Cited

OTHER PUBLICATIONS

Brief Summary of Notice of Preliminary Rejection for corresponding Korean patent application No. 10-2012-7030054 dated Apr. 8, 2014 (in English).

Notification of Reason for Refusal for corresponding Japanese Patent Application No. 2013-507989 mailed Dec. 26, 2013 (with English translation).

Chinese Office Action dated Aug. 28, 2014 for CN 201180021437.8 with English translation.

\* cited by examiner

METHOD AND SYSTEM OF HANDLING REQUESTS FOR LOCATION INFORMATION OF MOBILE DEVICES

BACKGROUND OF THE INVENTION

1. Field

Example embodiments of the present invention relate generally to wireless systems and handling requests for location information of mobile devices.

2. Description of the Related Art

Wireless systems can include multiple types of radio access technology. 3GPP standards define a method in which a user equipment (UE) that is camped on 4G technology can obtain certain circuit-switched (3G/2G) services without having to leave 4G technology. The circuit-switched information is passed through a defined interface, the SGs interface, between the mobile switching center (MSC) and the mobility management entity (MME). Examples of circuit-switched services include SMS handling and location updating.

For other circuit-switched core services, including making and receiving voice calls, carrying out supplementary service invocation, and providing location information to the circuit-switched core network, the UE must leave 4G radio coverage and move to 3G/2G radio coverage to complete the service. The process of leaving 4G radio coverage and moving to 3G/2G coverage to complete a circuit-switched service is referred to as "falling back". A potential problem that arises when the UE "falls back" to 3G/2G technology to carry out circuit-switched services is the necessity for the UE to register with the corresponding MSC whenever the UE "falls back" in a new MSC location area as defined by cell broadcasts associated with the MSC. The process of registering with the corresponding MSC can result in extra traffic being generated on the wireless system.

SUMMARY OF THE INVENTION

The present invention relates to methods of handling a request for location information for a mobile device attached to a wireless system that supports multiple types of radio access technology.

In one embodiment, a network element triggers the mobile device to send location information without causing the mobile to fall back from a first network of the wireless system to a second network of the wireless system, the first network conforming to a later generation of radio access technology than the second network.

In an embodiment, a location request requesting the location information of the mobile device is received at the network element and the triggering step is performed in response to receiving the location request.

In an embodiment, the triggering step includes paging the mobile device.

In an embodiment, the paging step includes sending a paging request to the mobile device that includes a short message service (SMS) indicator.

In an embodiment, the location information of the mobile device is received.

In one embodiment, the network element is a mobile switching center (MSC).

In an embodiment, paging the mobile device includes sending a paging request from the MSC to a mobility management entity (MME). The paging request has a service indicator set to the SMS indicator.

In an embodiment, paging the mobile device further includes sending the paging request from the MME to an eNode B associated with the mobile, and sending the paging request from the eNode B to the mobile device.

In another embodiment, the location request is received at the MSC from a home location register (HLR).

In another embodiment, the location request is a provide subscriber information (PSI) request, which requests information relating to a user equipment (UE) specified in the PSI including, for example, a current location of the UE.

In another embodiment, the received location information of the mobile device is forwarded from the MSC to the HLR.

In another embodiment, the received location information is forwarded from the MSC to the HLR inside a PSI acknowledgement message.

In another embodiment a release request is sent from the MSC to an MME.

In another embodiment, the wireless system supports at least one 2G or 3G access technology, and at least one 4G access technology.

In another embodiment, the location information includes an indication of the geographical location of the mobile device. The location information includes at least one of an evolved cell global identification (E-CGI), which uniquely identifies a cell in an evolved universal mobile telecommunication systems terrestrial radio access network (E-UTRAN) and a tracking area identification (TAI), which identifies an area being tracked by one or more E-nodeBs.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Various example embodiments of the present invention will now be described more fully with reference to the accompanying drawings in which some example embodiments of the invention are shown.

Figure 1:
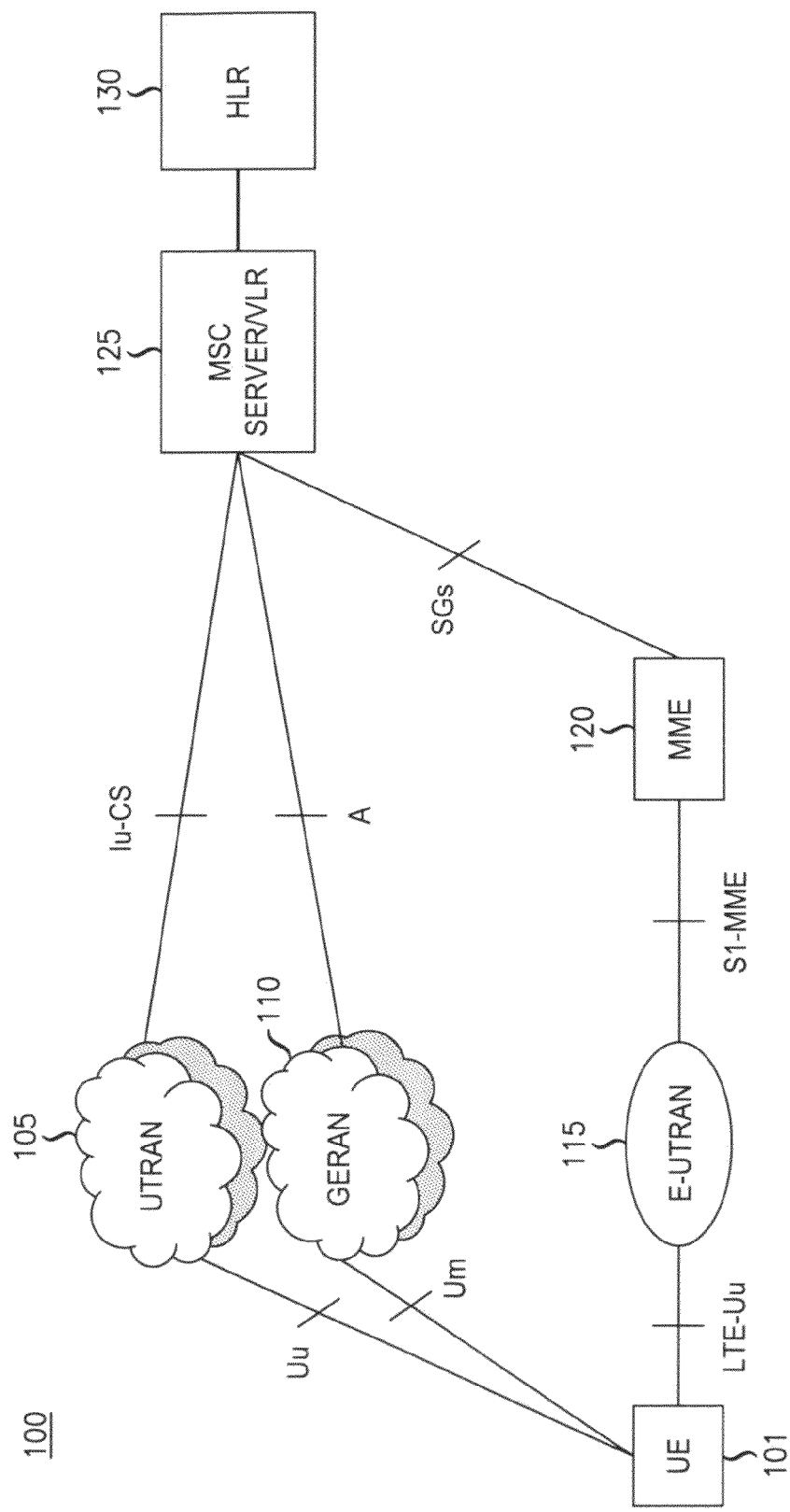
FIG. 1 is a diagram illustrating a wireless system according to example embodiments.

FIG. 1 illustrates a portion of a wireless system 100 according to example embodiments. Wireless system 100 includes multiple radio access networks according which use different types of radio access technology. Wireless system 100 may support 2G, 3G and 4G radio access technology. Referring to FIG. 1, wireless system 100 includes a universal mobile telecommunication systems (UMTS) terrestrial radio access network (UTRAN) 105; a Global System for Mobile Communications (GSM)/Enhanced Data rates for GSM Evolution (EDGE) radio access network (GERAN) 110; and an evolved UTRAN (E-UTRAN) 115. Wireless system 100 also includes a mobility management entity (MME) 120; a mobile switching center server (MSCS)/visiting location register (VLR) 125; a home location register (HLR); and a number of user equipment (UEs) including a UE 101.

As used herein, the term "user equipment (UE)", may be considered synonymous to, and may hereafter be occasionally referred to, as a terminal, mobile device, mobile unit, mobile station, mobile user, subscriber, user, remote station, access terminal, receiver, etc., and may describe a remote user of wireless resources in a wireless communication network. The term "base station" may be considered synonymous to and/or referred to as a base transceiver station (BTS), NodeB, extended Node B, femto cell, access point, etc. and may describe equipment that provides the radio baseband functions for data and/or voice connectivity between a network and one or more users.

UEs in wireless system 100 can access 3G and 2G services via the UTRAN 105, and the GERAN 110, respectively. UEs in wireless system 100 can access 4G LTE services via the E-UTRAN 115. For example, the UE 101 can connect to the UTRAN 105 via a Uu wireless interface; the UE 101 can connect to the GERAN 110 via a Um wireless interface; and the UE 101 can connect to the E-UTRAN 115 via an LTE-Uu wireless interface.

Though not illustrated, the GERAN 110 includes one or more base transceiver stations (BTSs) for providing wireless access to the UEs in the wireless system 100 and one or more base station controllers (BSCs) for managing the operation of the BTSs. Further, the UTRAN 105 and the E-UTRAN 115 include one or more NodeBs and E-NodeBs, respectively, for providing wireless access to the UEs in the wireless system 100 and one or more radio network controllers (RNCs) for managing the operation of the NodeBs and E-NodeBs.

The E-UTRAN 115 is connected to the MME 120 via an S1-MME interface. The MME 120 functions as a control node for the 4G LTE network of wireless system 100 associated with the E-UTRAN 115. The MME 120 handles paging and tracking functions for UEs attached to the 4G LTE network via E-UTRAN 115. The MME 120 also handles assigning temporary identification, authentication procedures, and enforcing roaming restrictions for UEs attached to the 4G LTE network via E-UTRAN 115.

The MSCS/VLR 125 is responsible for operations including routing voice calls, short message service (SMS) data, and circuit switched data for UEs in the wireless system 100. The MSCS/VLR 125 also keeps track of subscriber specific information for UEs within the portion of wireless system 100 the MSCS/VLR 125 serves. Subscriber specific information stored at the MSCS/VLR 125 can include identification information including, for example, international mobile subscriber identification (IMSI) for each UE, the phone number of each UE, authentication information associated with each UE and identification of an HLR of each UE. The MSCS/VLR 125 is connected to the UTRAN 105, the GERAN 110 and the E-UTRAN 115 through, for example Iu-CS, A, and SGs interfaces, respectively. The MSCS/VLR 125 is also connected to the HLR 130.

The HLR 130 is associated with the service provider operating the wireless system 100 and keeps track of subscriber specific information for all UEs attached to the wireless system 100. In addition to the subscriber specific information stored at the MSCS/VLR 125 discussed above, the HLR 130 keeps track of the location of the UEs in the wireless system 100.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Though, for the purpose of simplicity, the wireless system 100 is illustrated as having only one UTRAN, GERAN, MSCS/VLR, E-UTRAN and MME, the wireless system 100 may include any number of UTRANs, GERANs, MSCS/VLRs, E-UTRANs and MMEs, for example, corresponding to different geographical locations covered by the wireless system 100.

The process of handling a mobile terminated call in wireless system 100 of FIG. 1 will now be discussed with reference to a scenario in which the UE 101 is attached to the 4G LTE network within the wireless system 100 via the E-UTRAN 115.

When a mobile terminated call is made to the UE 101, a query is made to the HLR in order to retrieve subscriber specific information for the UE 101. The query may be made, for example, to determine the current location of the UE 101. Once a query is made to the HLR regarding the current location of UE 101, the HLR 130 may request information regarding the current location of the UE 101 from the MSCS/VLR 125. The HLR 130 uses, for example, a provide subscriber info (PSI) message in order to request the current location information from the MSCS/VLR 125. In response to the PSI message received from the HLR 130, the MSCS/VLR 125 generates a paging request, for example an SGsAP-PAGING-REQUEST, and sends the paging request to the MME 120.

The paging request generated by the MSCS/VLR 125 includes a service indicator which is set to a circuit switched (CS) indicator. The MME 120 receives the paging request including the CS indicator, and forwards the paging request including the CS indicator to the UE 101 via the E-UTRAN 115. Upon receiving the paging request including the CS indicator, the UE 101 performs a circuit switch fall-back (CSFB) operation by retuning to the 3G or 2G network to carry out the paging response. The fall-back to the 3G or 2G network will result in the UE 101 performing a location update operation by sending the global cell ID or the service area identifier (SAI) of the 2G or 3G network to which UE 101 falls back to the MSCS/VLR 125 if, for example, the location information of the 2G or 3G network the UE 101 falls back to is different from the 2G or 3G location information stored in the UE 101.

After the MSCS/VLR 125 obtains the 3G SAI or the 2G global cell ID, the MSCS/VLR 125 will release the connection of the UE 101. As a result, the UE 101 will reselect to the 4G access network which will likely necessitate another location update procedure. The location information obtained by the MSCS/VLR 125 is forwarded to the HLR 130 in the form of a PSI response message.

In the process descried above, it is necessary to perform at least two location update procedures. Each location update procedure may necessitate a number of operations taking place within the wireless system 100. For example, once the MSCS/VLR 125 receives a location update from the UE 101, the MSCS/VLR 125 may participate in an authentication operation with the UE 101 and the HLR 130. The authentication operation may include a number of messages being sent back and forth between the MSCS/VLR 125, the UE 101 and the HLR 130. Once the authentication operation is complete, the HLR 130 may update the location of the UE 101 within the HLR 130. Accordingly, reducing the amount of location updates will result in a reduction in the amount of data being sent and processed within the wireless system 100.

Figure 2:
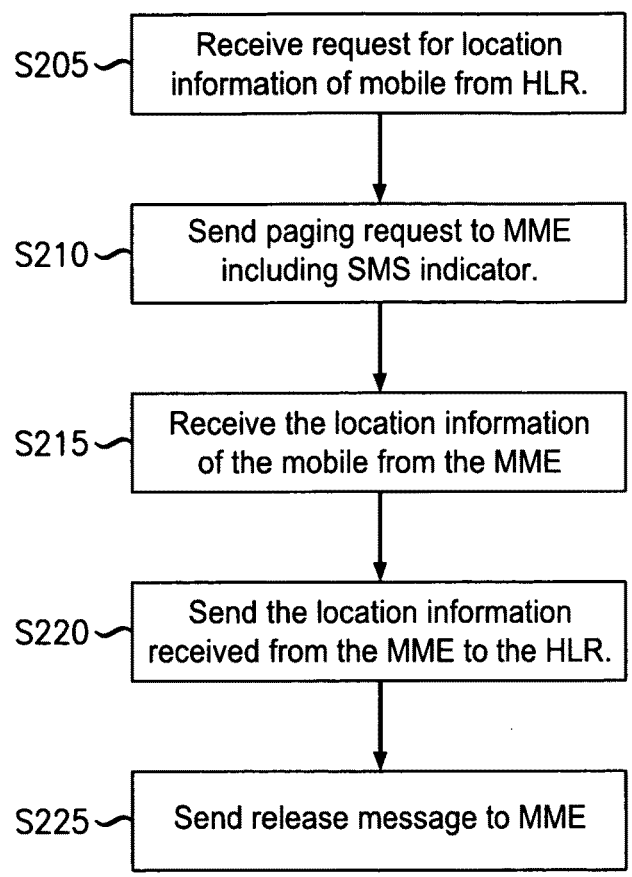
FIG. 2 is a flow chart illustrating a method of handling a request for location information according to example embodiments.

FIG. 2 is a flow diagram illustrating a method of handling a request for location information according to example embodiments. The method of handling a request for location information according to example embodiments will now be discussed from the perspective of the MSCS/VLR 125 with reference to a scenario in which the UE 101 is attached to the 4G LTE network within the wireless system 100 via the E-UTRAN 115.

It should also be noted that in some alternative implementations, the functions/acts noted may occur out of the order noted in FIG. 2.

In step S205, the MSCS/VLR 125 receives a request for location information from the HLR 130 in the form of, for example, a PSI message. The PSI message includes a request for the current location of the UE 101.

In step S210, after receiving the PSI message from the HLR 130, the MSCS/VLR 125 generates a paging request, for example an SGsAP-PAGING-REQUEST, and sends the paging request to the MME 120. The paging request generated by the MSCS/VLR 125 includes a service indicator which is set to an SMS indicator. The MSCS/VLR 125 may choose to include the SMS indicator in the paging request based on a selection of the operator of wireless system 100. For example, the indicator type for the service indicator value of the paging request generated by the MSCS/VLR 125 may be configurable, and the operator of the wireless system 100 may choose whether to set the service indicator for paging requests generated by the MSCS/VLR 125 to the CS indicator or the SMS indicator.

In step S215, as a result of sending the paging request including the SMS indicator in step S210, the MSCS/VLR 125 receives a service request message, for example an SGsAP-SERVICE-REQUEST, from the MME 120. The service request message includes location information of the UE 101. The location information includes, for example, one or both of an enhanced cell global identity (E-CGI) and a tracking area identifier (TAI) indicating a location of the UE 101.

In step S220, the MSCS/VLR 125 sends the location information received in step S215 to the HLR 130 in the form of, for example, a PSI response message.

In step S225, the MSCS/VLR 125 sends a release message to the MME 120 in order to end the process of obtaining the location information of the UE 101.

The method described above with reference to FIG. 2 allows for triggering the UE 101 to send location information without causing the UE 101 to fall back from the 4G LTE network to the less advanced, older generation 2G or 3G networks. In particular, configuring the MSCS/VLR 125 to respond to a PSI message by forwarding a paging request in which the service indicator is set to the SMS indicator, as discussed above with reference to step S205, prevents the UE 101 from performing a CSFB operation; thus eliminating the location update operations ordinarily triggered by the UE 101 falling back from the 4G LTE network to the 2G or 3G network, and subsequently reselecting the 4G network. This result will be discussed in greater detail below with reference to an example illustrated in FIG. 3.

Figure 3:
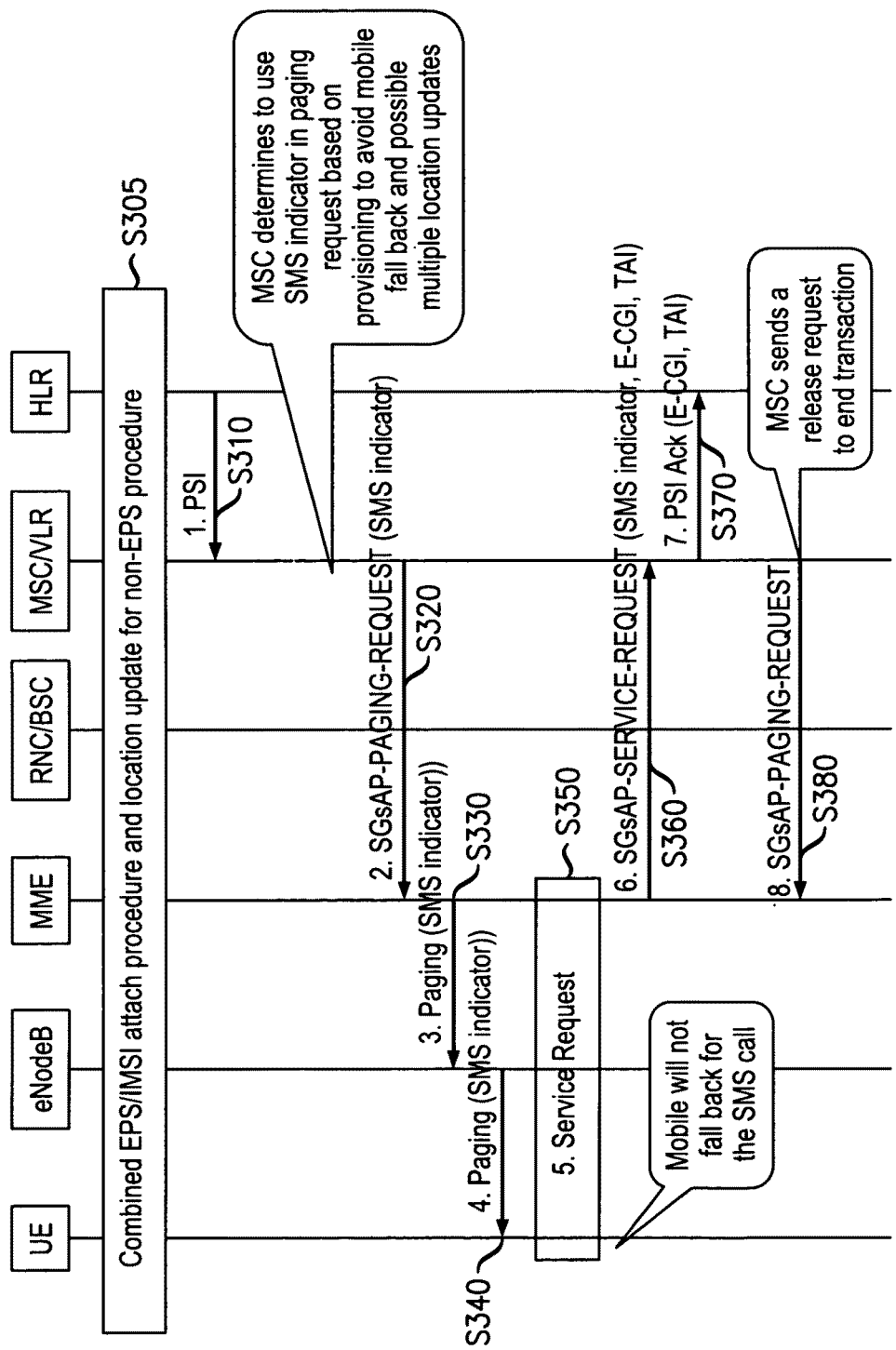
FIG. 3 is a communications flow diagram illustrating a process of handling a mobile terminated call according to example embodiments.

FIG. 3 is a communications flow diagram illustrating a process of handling a mobile terminated call according to example embodiments. The process of handling a mobile terminated call will now be discussed with reference to a scenario in which the UE 101 is attached to the 4G LTE network within the wireless system 100 via the E-UTRAN 115.

It should also be noted that in some alternative implementations, the functions/acts noted may occur out of the order noted in FIG. 3.

Referring to FIG. 3, in step S305, a combined EPS (enhanced packet service)/IMSI attach procedure is performed as well as a location update for the CS domain according to well known methods.

In step S310, as a result of the HLR receiving an Any Time Interrogation request or a mobile terminating call being placed for the UE 101, the HLR sends a PSI message to the MSCS/VLR 125 requesting a current location of the UE 101.

In step S320, in response to the PSI message sent in step S310, the MSCS/VLR 125 sends an SGsAP-PAGING-REQUEST message to the MME 120. The MSCS/VLR 125 sets the service identifier of the SGsAP-PAGING-REQUEST message based on the provisions of the operator of the wireless system 100. In the example illustrated in FIG. 3, it is assumed the operator of the wireless system 100 has set the MSCS/VLR 125 to generate SGsAP-PAGING-REQUEST messages including service identifiers set to the SMS service identifier.

In step S330, in response to the SGsAP-PAGING-REQUEST sent in step S320, the MME 120 sends a paging request to the eNodeB within the E-UTRAN 115 to which the UE 101 is attached. The paging request sent by the MME 120 includes the SMS indicator.

In step S340, in response to the in response to the paging request sent in step S330, the eNodeB within the E-UTRAN 115 to which the UE 101 is attached sends a paging request to the UE 101. The paging request sent by the eNodeB includes the SMS indicator.

In step S350, in response to receiving the paging request sent in step S340, a service request procedure is conducted between the UE 101 and the MME 120. During the service request procedure, the UE 101 sends a service request message to the MME 120.

Because the paging request sent in step S340 included an SMS indicator as opposed to a CS indicator, the UE 101 does not perform a fall back operation by detaching from the 4G network associated with the E-UTRAN 115 and attaching to one of the 2G and 3G networks associated with the GERAN 110 and the UTRAN 105, respectively.

In step S360, in response to the paging request sent in step S350, the MME 120 sends an SGsAP-SERVICE-REQUEST message to the MSCS/VLR 125. The SGsAP-SERVICE-REQUEST message includes the SMS indicator and location information for the UE 101. The location information includes, for example, one or both of an E-CGI and a TAI indicating a location of the UE 101.

In step S370, the MSCS/VLR 125 sends a PSI acknowledgement message to the HLR 130. The PSI acknowledgement includes the location information sent in step S360.

Once the location information of the UE 101 is received by the HLR 130, the HLR 130 can respond to the Any Time Interrogation request or continue the mobile terminated call procedures.

In step S380, the MSCS/VLR 125 sends an SGsAP-RELEASE-REQUEST message to the MME 120 ending the process of obtaining the location information of the UE 101.

Accordingly, by configuring an MSC/VLR to respond to a PSI request by sending a paging request including an SMS indicator instead of a CS indicator, the process of handling a mobile terminated call according to example embodiments discussed above with reference to FIG. 3 allows current location information of a UE to be obtained by an HLR without requiring the UE to perform a fall-back procedure. According to example embodiments, a mobile terminated call for a UE currently attached to a 4G LTE network can be properly routed to the UE without requiring multiple location update procedures, and thus, unwanted UE authentication and HLR update procedures can be avoided as well. Consequently, an amount of traffic and data processing on the wireless system 100 is reduced.

While example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The invention being thus described, it will be obvious that the same may be varied in many ways. Such variations are not to be regarded as a departure from the invention, and all such modifications are intended to be included within the scope of the invention.

What is claimed:

1. A method of handling a request for location information of a mobile device attached to a first network of a wireless system that supports multiple access technologies, the method comprising:
    receiving a location request requesting location information of the mobile device, the mobile device being attached to a first network of the wireless system; and
    triggering, by a network element, the mobile device to send the location information without causing the mobile to fall back from the first network of the wireless system to a second network of the wireless system, the first network conforming to a later generation of radio access technology than the second network,
    wherein the triggering step includes paging the mobile device by sending a paging request that includes a short message service (SMS) indicator to the mobile device, the triggering step is performed in response to the location request, and the first network is a 4G long term evolution (LTE) network.

2. The method of claim 1, wherein the receiving a location request includes reeving the location request at the network element;
    receiving, at the network element, a location request requesting the location information of the mobile device, wherein the triggering step is performed in response to receiving the location request.

3. The method of claim 2, further comprising:
    receiving, at the network element, the location information of the mobile device.

4. The method of claim 3, wherein the network element is an MSC.

5. The method of claim 4 wherein the paging step includes sending the paging request from the MSC to a mobility management entity (MME), the paging request having a service indicator set to the SMS indicator.

6. The method of claim 5 wherein the paging step further includes sending the paging request from the MME to an eNode B associated with the mobile, and sending the paging request from the eNode B to the mobile device.

7. The method of claim 4, wherein the location request is received at the MSC from a home location register (HLR).

8. The method of claim 7, wherein the location request is a provide subscriber information (PSI) request.

9. The method of claim 7, further comprising:
    forwarding the received location information of the mobile device from the MSC to the HLR.

10. The method of claim 9, wherein the received location information is forwarded from the MSC to the HLR inside a PSI acknowledgement message.

11. The method of claim 9, further comprising:
    sending a release request from the MSC to an MME.

12. The method of claim 2 wherein the second network conforms to at least one of 2G or 3G access technology, and the first network conforms to 4G LTE access technology.

13. The method of claim 1 wherein the location information includes an indication of the geographical location of the mobile device.

14. The method of claim 13 wherein the location information includes at least one of an evolved cell global identification (E-CGI) and a tracking area identification (TAI).

15. The method of claim 1 wherein the triggering includes sending, from the network element to the mobile device, the paging request such that the paging request triggers the mobile device to send location information identifying a location of the mobile device without causing the mobile device to fall back to the second network.

16. The method of claim 15 wherein,
    the receiving includes receiving the location request requesting the location information of the mobile device at the network element, and
    the paging request is generated by the network element in response to the location request, and the paging request generated by the network element includes the short message service (SMS) indicator.

17. The method of claim 15, wherein the first network is an LTE network.

* * * * *